(12) United States Patent  
Chellappa et al.

(10) Patent No.: US 9,501,390 B1  
(45) Date of Patent: Nov. 22, 2016

(54) ENHANCING AUTOMATED MOBILE APPLICATION TESTING

(71) Applicant: Amazon Technologies, Inc., Reno, NV (US)

(72) Inventors: Sridhar Chellappa, Karnataka (IN); Ashok Thangamani Nadar, Karnataka (IN); Kamlesh Tekhbahadur Talreja, Karnataka (IN); Pavan Kumar Surishetty, Seattle, WA (US); Lokendra Singh, Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 530 days.

(21) Appl. No.: 13/732,774

(22) Filed: Jan. 2, 2013

(51) Int. Cl.
*G06F 9/44* (2006.01)
*G06F 11/36* (2006.01)

(52) U.S. Cl.
CPC ........ *G06F 11/3692* (2013.01); *G06F 11/3684* (2013.01); *G06F 11/3688* (2013.01)

(58) Field of Classification Search
CPC ........... G06F 9/44589; G06F 11/3684; G06F 11/3688
USPC .......................................................... 717/126
See application file for complete search history.

(56) References Cited

U.S. PATENT DOCUMENTS

| | | | |
|---|---|---|---|
| 6,408,403 B1* | 6/2002 | Rodrigues et al. | 714/38.11 |
| 8,191,046 B2* | 5/2012 | Dern | G06F 9/528 717/124 |
| 2008/0109475 A1* | 5/2008 | Burmester | G06F 17/2785 |
| 2010/0005446 A1* | 1/2010 | Drissi et al. | 717/114 |
| 2012/0042302 A1* | 2/2012 | Sikandar et al. | 717/125 |
| 2012/0131387 A1* | 5/2012 | Salloum et al. | 714/38.1 |
| 2012/0144373 A1* | 6/2012 | Cook | 717/125 |
| 2012/0317638 A1* | 12/2012 | Carrara et al. | 726/17 |
| 2013/0086202 A1* | 4/2013 | Connelly | G06F 9/45558 709/217 |
| 2013/0326475 A1* | 12/2013 | Gulwani et al. | 717/107 |

* cited by examiner

*Primary Examiner* — Li B Zhen
*Assistant Examiner* — Bradford Wheaton
(74) *Attorney, Agent, or Firm* — Thomas | Horstemeyer, LLP (57) ABSTRACT

Disclosed are various embodiments for enhancing automated testing for mobile applications by using an automated testing set. An automated testing pattern set may include multiple patterns that have been determined to yield accurate results in testing applications within a particular application category. The automated testing pattern set may be created for each application category by applying automated random pattern generator tests to applications within the same application category and verifying the accuracy of the random patterns produced by the random pattern generator tests by comparing the results from manual testing. The automated testing pattern set is then created based on patterns ranked according to an assigned accuracy score.

20 Claims, 8 Drawing Sheets

ENHANCING AUTOMATED MOBILE APPLICATION TESTING

BACKGROUND

Developers test applications for quality assurance and other defects prior to releasing to the marketplace. While there are various automated testing tools available, current automated testing tools are not completely reliable as they still may yield false positive or false negative results. As such, manual testing is still considered the most accurate and reliable form of application testing. Unfortunately, manual testing is inefficient, costly, and time consuming.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Prior to release in the marketplace, applications that are executed on mobile devices and other devices endure a testing process to detect defects and ensure quality assurance. While there are various automated testing tools available, they still occasionally yield unreliable results. Additionally, while manual testing produces the most accurate results, the process is both costly and inefficient. Due to the large number of applications being developed daily, there is a need for efficient, accurate, and reliable automated testing.

The present disclosure provides an enhancement to automated testing by creating a set of patterns specific to each type of application category in which there is a high confidence that the use of the pattern set will yield reliable and accurate results. The patterns may comprise a series of randomly generated simulated user inputs which may be used to test an application. Each of the patterns in the pattern set have been created through a prior automated testing of multiple applications and verified through manual testing. The patterns that are determined by manual testing to yield the most accurate and reliable results for applications within the same application category are the patterns used to generate the pattern set. After the pattern set is generated and complete, the need for manual testing is minimized. Thus, the improved automated testing may address the efficiency and cost concerns in producing accurate and reliable testing results.

In the following discussion, a general description of the system and its components is provided, followed by a discussion of the operation of the same.

Figure 1:
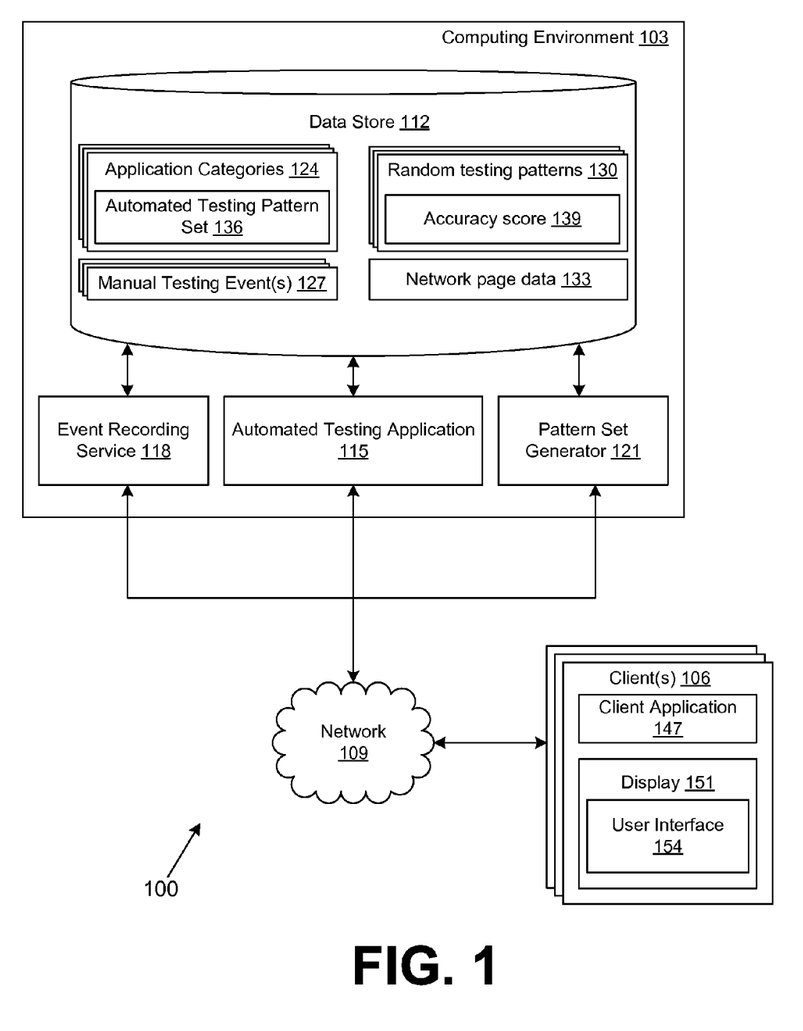
FIG. 1 is a drawing of a networked environment according to various embodiments of the present disclosure.

With reference to FIG. 1, shown is a networked environment 100 according to various embodiments. The networked environment 100 includes a computing environment 103 and a plurality of clients 106, which are in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be locating in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112 for example, is associated with the operation of the various applications and/or functional entities described below.

The components executed on the computing environment 103, for example, include an automated testing application 115, an event recording service 118, a pattern set generator 121, and other applications, services, processes, systems, engines, or functionality not discussed in detail herein. The automated testing application 115 is executed to perform automated testing on an application by using a predefined automated testing pattern set associated with the application category associated with the application. The event recording service 118 is executed to record testing events on an application. The pattern set generator 121 is executed to populate the automated testing pattern sets with selected random testing patterns 130.

The data stored in the data store 112 includes, for example, application categories 124, manual testing events 127, random testing patterns 130, network page data 133, and potentially other data. Applications may be organized into different types of application categories 124. The different types of application categories 124 may include, for example, tools, books/references, communication, media/video, shopping, economy finance, brain/puzzles, sports, travel, health/fitness, personalization, arcade/action, education, entertainment, comics, casual games, business, learning, productivity, news/magazines, and any other type of application. Each application category 124 further comprises an automated testing pattern set 136. The automated testing pattern set 136 comprises the patterns determined to yield accurate and reliable results when used in automated testing of an application associated with the corresponding application category 124.

The manual testing events 127 comprise series of inputs received during the manual testing of an application. Random testing patterns 130 comprise patterns that are generated during random pattern generator tests used to build the automated testing pattern set 136. Associated with each random testing pattern 130 is an accuracy score 139 which may reflect a confidence rating on whether the random testing pattern will yield reliable results.

Network page data 133 may include any data relating to network pages, served up by the automated testing application 115. To this end, network page data 133 may include static network page or static elements of network pages, for example, in hypertext markup language (HTML), extensible markup language (XML) and/or any other language suitable for creating network pages. Further network page data 133 may include code that generates dynamic network pages when executed or interpreted in the computing environment 103. Such code may be written in any suitable programming language, such as PHP, Perl, Objective C, Java, Ruby, etc. Network page data 133 may also include code configured to be executed or interpreted within a client 106 in order to render a dynamic network page. Such code may be referred to as applets and may be written in any suitable programming language, such as Java Script, Java, etc.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 151. The display 151 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a client application 147 and/or other applications. The client application 147 may be executed in a client 106, for example, to access network content served up by the computing environment 103 and/or other servers, thereby rendering a user interface 154 on the display 151. The client application 147 may, for example comprise a browser, a mobile application, etc., and the user interface 154 may correspond to a network page, a mobile application screen, etc. The client 106 may be configured to execute applications beyond the client application 147 such as, for example, mobile applications, email applications, instant message applications, social networking applications and/or other applications.

Next, a general description of the operation of the various components of the networked environment 100 is provided. To begin, application developers subject their applications to a testing process prior to releasing to the marketplace for detection of defects and quality assurance. The most reliable and accurate way to test an application for defects is through manual testing. However, manual testing is both costly and time consuming. Given the high output of applications from developers, there is insufficient time to use manual testing to test each application. Unfortunately, current automated testing has a tendency to yield false positive or false negative results. However, automated testing may be enhanced to become more desirable and efficient by using a predetermined set of testing patterns that have been manually verified to yield accurate and reliable results.

In some embodiments, the pattern set generator 121 may generate an automated testing subset 136 for each type of application category 124. For each application submitted for testing, the pattern set generator 121 may initially identify the appropriate application category 124. There are many different types of application categories 124 such as, for example, tools, books/references, communication, media/video, shopping, economy finance, brain/puzzles, sports, travel, health/fitness, personalization, arcade/action, education, entertainment, comics, casual games, business, learning, productivity, news/magazines, and any other type of application. Additionally, each category may further be based on the type of platform (e.g. Android®, iOS®, Windows® Phone, etc.) compliant with the application, application's developer, or other factor associated with the application. Essentially, applications within the same application category are similar enough to test with the same set of patterns since developers, for at least efficiency purposes, appear to use the same structure or format when creating similar applications.

Once the pattern set generator 121 identifies the appropriate application category 124 it may begin populating the associated automated testing pattern set 136. To populate the associated automated testing pattern set 136 the application is put through both automated testing and manual testing. The automated testing includes a random pattern generator based on an algorithm that may be specific to the particular application category 124. The random pattern generator creates random testing patterns 130 which are random patterns of inputs that are applied to the application in order to detect defects within the application. For each pattern applied to the application, the application either passes or fails (e.g. produces errors).

The application is also put through manual testing. In manual testing, which is considered to be more accurate and reliable, the patterns are tested and the results are recorded. Following both the manual testing and automated testing, the pattern set generator 121 compares the respective results to determine which of the random testing patterns 130 generated false positive or false negative results during the automated testing. Since the manual testing is considered to be more accurate and reliable, an automated testing result associated with a particular random testing pattern 130 is considered to be a false positive or false negative if the automated testing result is different from the manual testing result associated with the same random testing pattern 130. As such, an accuracy score 139 associated with each of the random testing patterns 130 may be updated to reflect the confidence relative to the specific random testing pattern 130 likelihood to yield an accurate and reliable result. The more times that a random testing pattern 130 is tested against applications in the same application category 124 and verified as accurate through the manual testing, the greater the accuracy score 139 should be.

In one non-limiting example, after each comparison of results following the testing of an application, the accuracy score 139 for a particular random testing pattern 130 may be incremented or decremented based on the comparison of the results. As such, if a pattern has been tested one-hundred times and has yielded an accurate results seventy-five times, the accuracy score 139 would be fifty. If another pattern also tested one-hundred times has only yielded fifty accurate results, the corresponding accuracy score 139 would be zero.

In another non-limiting example, the accuracy score 139 may reflect a percentage based on the number of times that the random testing pattern has been tested and yielded accurate results. For example, assume that a random testing pattern has been used to test one-thousand applications and has produced accurate results in nine hundred and seventy tests. The accuracy score 139 may reflect that the random testing pattern yielded accurate results during 97% of the tests. While multiple examples of approaches have been shown to calculate the accuracy score, other approaches in determining an accuracy score may also be used.

Regardless of the approach an accuracy score 139 is calculated for each of the random testing patterns 130. The pattern set generator 121 evaluates the accuracy score 139, and determines whether or not to use any of the random testing patterns 130 to populate the automated testing pattern set 136 associated with the particular application category 124.

In one non-limiting example, the pattern set generator 121 may rank all of the random testing patterns 130 used during testing of applications within a particular application category 124. Following the ranking of the random testing patterns 130, the pattern set generator 121 may select a predefined percentage of the random testing patterns 130. For example, the pattern set generator 121 may select the top 5% of the ranked patterns to add to the automated testing pattern set 136. Alternatively, the pattern set generator 121 may select a predefined number of the highest ranked random testing patterns 130. For example, regardless of how many random testing patterns 130 exist, the pattern set generator 121 may select up to five-hundred of the highest ranked random testing patterns 130.

In another non-limiting example, the pattern set generator 121 may use a predefined accuracy score to populate the automated testing pattern set 136. For example, assume the predefined accuracy score is one-hundred. As such, the pattern set generator 121 may populate the automated testing pattern set 136 with all random testing patterns 130 with a corresponding accuracy score 139 greater than one-hundred.

The pattern set generator 121 may then determine whether an automated testing pattern set 136 is complete. In one non-limiting example, the automated testing pattern set 136 may be complete after each of the patterns has been tested against a predefined number of applications. In another non-limiting example, the automated testing pattern set 136 may be considered complete if it has a predefined number of random testing patterns with a particular predefined accuracy score 139.

In some embodiments, following the creation of the automated testing pattern set 136, a user at a client 106 may access a network site generated by the automated testing application 115 over a network 109 to use reliable automated testing to test a particular application. For example, the automated testing application 115 may receive an application for testing over a network 109 from a user at a client 106. Upon receipt of the application, the automated testing application 115 may identify the appropriate application category 124.

The automated testing application 115 may use various factors to determine the appropriate application category 124 such as, for example, the application's metadata, the type of compliant platform (e.g. Android®, iOS®, Windows® Phone, etc.), the application's developer, or other factor associated with the application. As such the automated testing application 115 may identify a particular application category 124. Each application category 124 may have a corresponding automated testing pattern set 136 which includes random testing patterns 130 which were previously determined to yield accurate and reliable results when applied to applications in the specific application category 124.

The automated testing application 115 applies the automated testing pattern set 136 to the received application. The automated testing application 115 may detect defects by identifying errors following the application of the automated testing pattern set 136 to the application. Following completion of the automated test using the automated testing pattern set 136, the automated testing application 115 sends notification to a user at a client 106 detailing the results of the automated test. For example, the results may indicate whether the application passed or failed the test (i.e. detection of errors). Additionally, if the application failed the test, the results may further include information detailing errors that occurred during the testing of the application.

In another embodiment, a user at a client 106 may access a network site from the event recording service 118 over a network 109 to record a series of user inputs applied during the manual testing of an application. For example, during the manual testing of an application, the event recording service 118 may record the manual testing events 127 (i.e. series of user inputs) used by the manual tester during the testing of an application. These manual testing events 127 may be stored for future testing of a modified version of the application. Following completion of the manual testing, the event recording service 118 may receive results from the manual tester on a client 106, and encode a result notification to send to a user (e.g. developer) on a client 106.

In one non-limiting example, a user on a client 106 may access a network site from the automated testing application 115 over a network 109 to use automated testing to test a modified application from an original application that has previously undergone manual testing and failed. The automated testing application 115 may determine the appropriate manual testing events 127 to apply to the modified application. The automated testing application 115 may determine whether the modified application passed or failed based on whether any errors occurred during the application of the manual testing events 127 to the modified application. The automated testing application 115 may encode a result notification including the results of the automated testing of the modified application to send to a user (e.g. developer) on a client 106.

The result notification may be in the form an electronic message, such as, for example, an email message, an instant message, a text message, a message embedded within a network page, or other type of notification. The results may include the may be able to use reliable automated testing to test an application. The result notification may also include other information associated with the testing of the application. After encoding the result notification with the testing results, the automated testing application 115 sends the result notification to client device associated with a user (e.g. developer).

Figure 2:
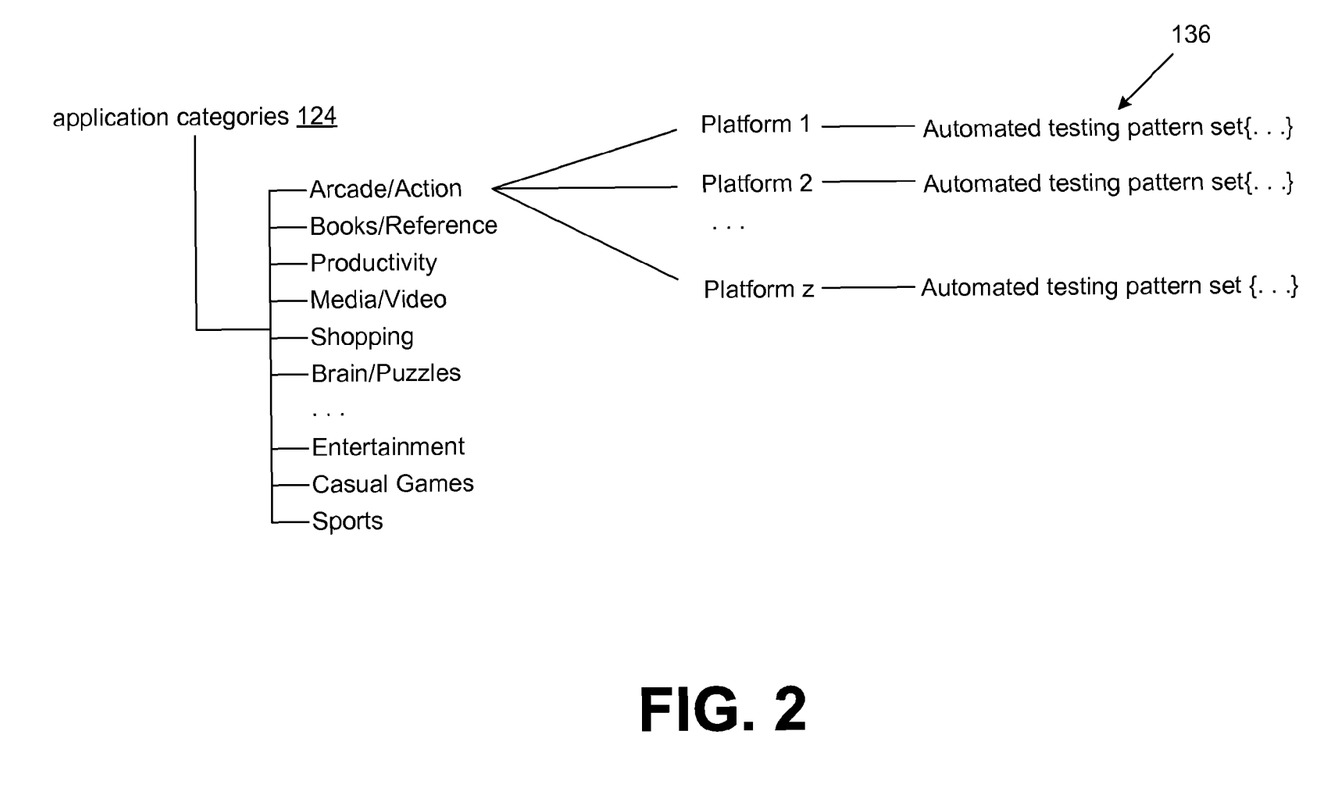
FIG. 2 is a drawing of an example of the structure of the application categories in the network environment of FIG. 1 according to various embodiments of the present disclosure.

Referring next to FIG. 2, shown is drawing of an example of the structure of the application categories 124 in the data store 112 (FIG. 1). As illustrated there may exists many different types of application categories 124 such as, for example, tools, books/references, communication, media/video, shopping, economy finance, brain/puzzles, sports, travel, health/fitness, personalization, arcade/action, education, entertainment, comics, casual games, business, learning, productivity, news/magazines, and any other type of application. The application categories may further be organized based on the type of platform compatible with the application, such as, for example, Android®, iOS®, Windows® Phone, or other types of platforms. Each application category 124 further comprises an automated testing pattern set 136 which contains the random testing patterns 130 generated through a random pattern automated testing tool discussed in more detail in reference to FIG. 3.

Figure 3:
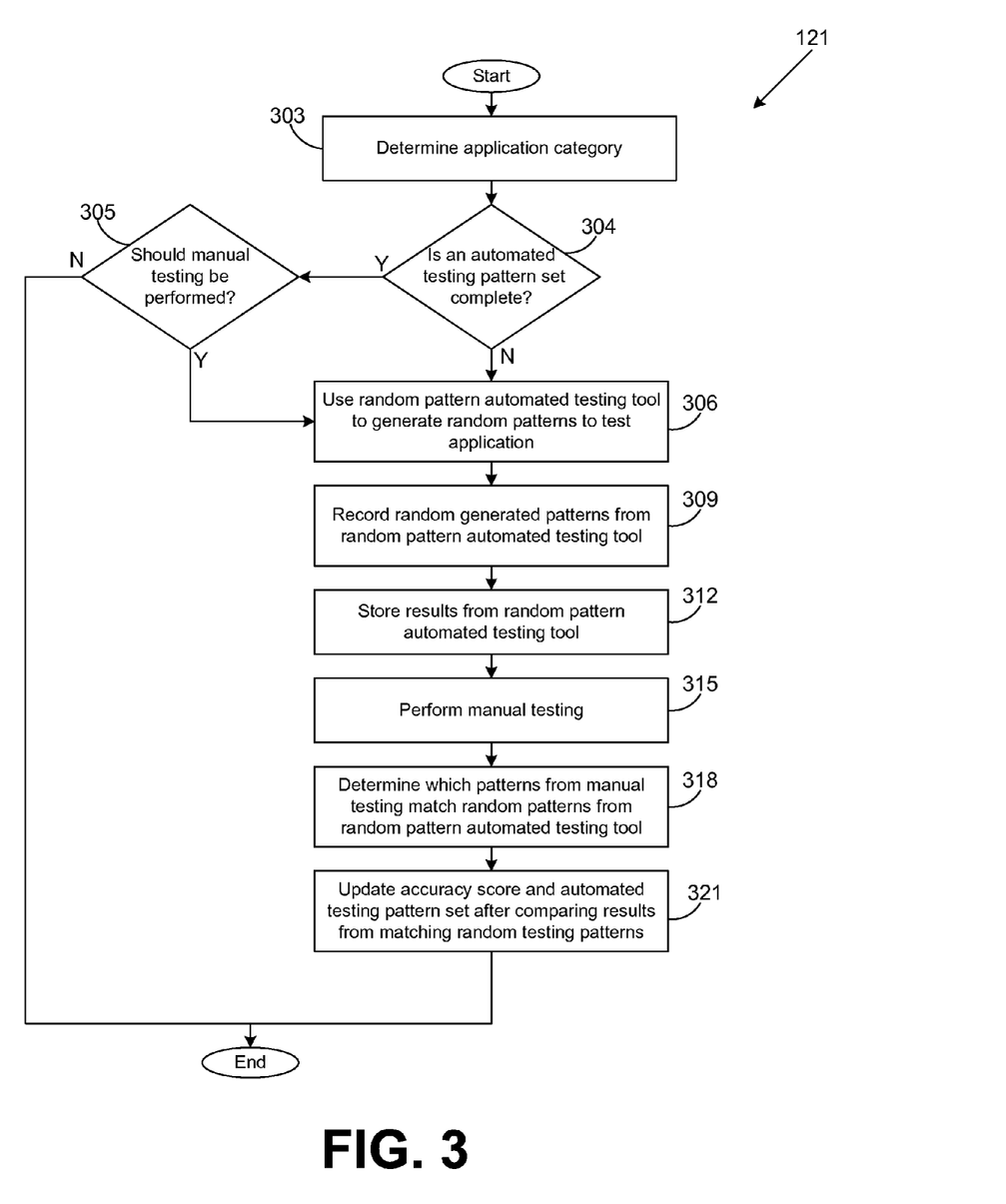
FIGS. 3,4,5, 6A, and 6B are flowcharts each illustrating an example of functionality implemented as portions of the pattern set generator, automated testing application and event recording service executed in a computing environment in the networked environment of FIG. 1 according to various embodiments of the present disclosure.

Turning now next to FIG. 3, shown is a flowchart that provides one example of the operation of a portion of the pattern set generator 121 according to various embodiments. It is understood that the flowchart of FIG. 3 provides merely an example of the many different types of functional arrangements that may be employed to implement the operation of the portion of the pattern set generator 121 as described herein. As an alternative, the flowchart of FIG. 3 may be viewed as depicting an example of steps of a method implemented in the computing environment 103 (FIG. 1) according to one or more embodiments.

The flowchart of FIG. 3 provides an example of the functionality that may be performed during the generation of the automated testing pattern set 136. The automated testing pattern set 136 for each application category is created following a series of random pattern generator tests coupled with manual testing to verify the results and accuracy of the patterns used to test multiple applications during the random pattern generator tests.

Beginning with box 303, the pattern set generator determines an application category 124 associated with a particular application. The application category 124 may comprise tools, books/references, communication, media/video, shopping, economy/finance, brain/puzzles, sports, travel, health/fitness, personalization, arcade/action, education, entertainment, comics, casual games, business, learning, productivity, news/magazines, or any other type of application.

In one non-limiting example, the pattern set generator 121 may determine the appropriate application category 124 by evaluating many different factors associated with the application such as, for example, an application's metadata, developer name, type of compatible mobile platform (e.g. Android®, iOS®, Windows® Phone, etc.) or other factor associated with an application. For example, the pattern set generator 121 may evaluate the metadata of an application and determine that the application is an educational application. Further evaluation of the application, may discover that the application was developed for use on an Android® platform. Therefore, the pattern set generator 121 may determine that the appropriate application category 124 is an educational application category specific to the Android® platform. Upon determining the appropriate application category 124 for a select application, the pattern set generator 121 proceeds to box 304.

In box 304, the pattern set generator 121 determines whether an automated testing pattern set 136 has been established. In one non-limiting example the automated testing pattern set 136 may be determined to be established for a particular application category 124 if a predetermined number of applications have been tested through the pattern set generator 121. For example, an automated testing pattern set 136 may be considered to be complete after the pattern set generator 121 has tested one-thousand applications associated with the corresponding application category 124 or some other predetermined threshold number of applications.

In another non-limiting example, the automated testing pattern set 136 may be considered established if a predefined number of patterns have been added to the automated testing pattern set 136. For example, the pattern set generator 121 may only add random testing patterns 130 that have accuracy score 139 that has reached a predefined threshold number, such as, for example one-hundred or other value. The pattern set generator 121 may determine that the automated testing pattern set 136 is established when a predefined number of random testing patterns 130 have obtained an accuracy score 139 of one-hundred or other value.

If the pattern set generator 121 determines that the automated testing pattern set 136 for the selected application category 124 is established, the pattern set generator 121 proceeds to box 305. Otherwise, the pattern set generator 121 proceeds to box 306.

In box 305, the pattern set generator 121 determines whether manual testing should be performed on the application in order to verify and/or update the established automated testing pattern set 136. In one non-limiting example, once the automated testing pattern set 121 is established, the pattern set generator 121 may periodically continue to use automated testing coupled with manual testing to verify and/or update the established automated testing pattern set 136 over time. While there is a confidence that the established automated testing pattern set 136 will yield reliable results, the pattern set generator 121 may continue to verify and/or update the automated testing pattern set 137 given that the nature of the applications in a given category may generally change over time.

In one example, the pattern set generator 121 may determine to manual testing for every x applications received following the establishment of the corresponding automated testing pattern set 136, where x is a suitable interval such as, for example, 50, 100, or other value deemed appropriate. In another example, the pattern set generator 121 may gradually decline the frequency that it uses manual testing to verify results based on a predefined sliding scale. Regardless of the approach to determine whether the application should go through a manual testing verification, if the pattern set generator 121 determines that the application should be tested with automated testing coupled with manual testing for verification, the pattern set generator 121 proceeds to box 306. Otherwise, the pattern set generator 121 ends.

In box 306, the pattern set generator 121 performs a type of automated testing on an application by generating random testing patterns 130 and applying the random testing patterns 130 as inputs to the application to produce results associated with each of the random testing patterns. In a non-limiting example, the random pattern automated testing tool may be based on an algorithm specific to the associated application category 124 that creates random patterns of inputs used to test the application. The pattern set generator 121 may apply each pattern to the application and further evaluate whether the pattern yields a positive or negative result. Upon generating and testing each of the random testing patterns 130 by the random pattern automated testing, the pattern set generator 121 proceeds to box 309.

In box 309, the pattern set generator 121 records and stores the random generated patterns from the random pattern automated testing tool. In some non-limiting examples, the random generated patterns 130 may be similar patterns that have already been stored and tested during previous tests on other applications within the same application category 124. Therefore, it should be noted that the random generated patterns 130 may be a repeat pattern from a prior test. If any of the random generated patterns 130 are repeat patterns, those patterns will not need to be stored again. The pattern set generator 121 should note the repeat pattern, and use the already stored pattern when updated the accuracy score 139. In another non-limiting example, the random generated patterns 130 may be newly tested and therefore, may be stored relative to the testing of applications in a particular application category. Upon recording and storing the random generated patterns 130 generated during the random pattern automated testing, the pattern set generator 121 proceeds to box 312.

In box 312, the pattern set generator 121 stores the results associated with each of the random testing patterns. As such, the results may be used to determine whether the testing of the application using the specific random testing pattern yielded any false positive or false negative results. Upon storing the results associated with each of the random testing patterns following the use of the random pattern automated testing tool to test the application, the pattern set generator 121 proceeds to box 315.

In box 315, the pattern set generator 121 monitors the performance of manual testing of the application. In one non-limiting example, the pattern set generator 121 may record and store the user inputs received during the manual testing of the application. The user inputs may be equivalent to the random testing patterns 130 generated during the random pattern automated testing of the same application. In another non-limiting example, the pattern set generator 121 may provide the manual tester with the random testing patterns 130 generated during the automated testing of the application. In another non-limiting example, the pattern set generator 121 may be able to monitor and store the results of each series of user inputs during the manual testing and determine whether any errors have occurred during the manual testing. Upon completion of the manual testing, the pattern set generator 121 proceeds to box 318.

In box 318, the pattern set generator 121 determines which patterns were inputted during the manual testing match the random testing patterns 130 generated from the random pattern automated testing. For example, the manual testing of the application may create its own series of patterns to test for defects in the application. Likewise, the patterns created during both the manual testing and the random pattern automated testing tool may match. Therefore, when the patterns match, the results can be compared for determining whether the random pattern automated testing tool yielded any false positives or false negatives associated with a particular random testing pattern 130.

Figure 4:
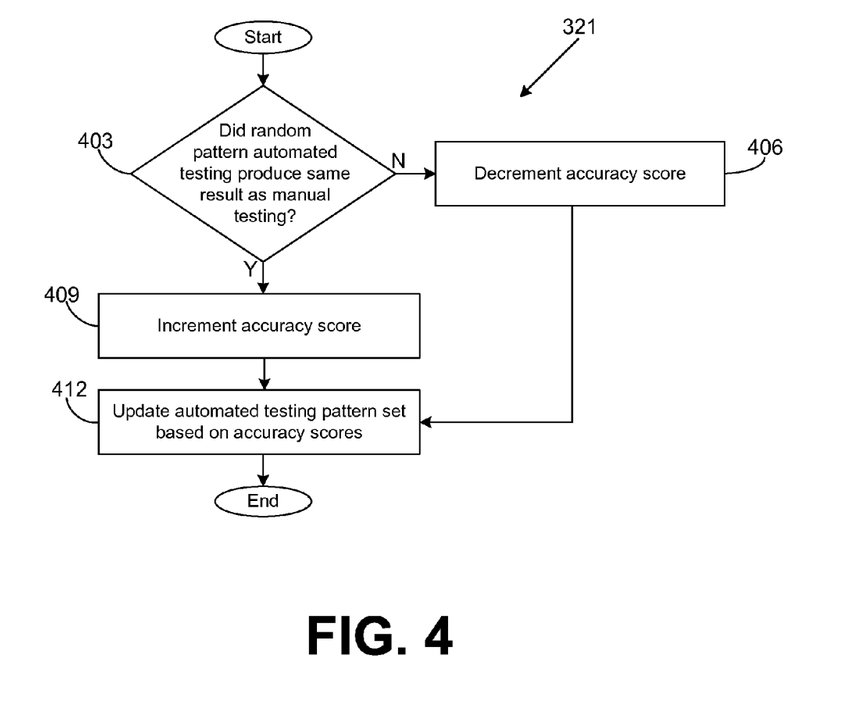

In box 321, the pattern set generator 121 updates the accuracy score 139 associated with each random testing pattern 130 as well as the automated testing pattern set 136 associated with the application category 124, as discussed in more detail relative to FIG. 4. For example, the pattern set generator 121 may compare the results corresponding to each random testing pattern 130 from the manual testing and the random pattern automated testing tools. Since the manual testing produces the more reliable and accurate results, a random testing pattern 130 is considered more reliable it produced the same result as the manual testing during the random pattern automated testing. Therefore, the accuracy score 139 associated with the random testing pattern 130 will need to be increased according to confidence. Additionally, the automated testing pattern set 136 may also need to be updated if the change in the accuracy score affects the selection of the random testing patterns 130 used to populate the automated testing pattern set 136. After updating the accuracy score 139 and automated testing pattern set 136, the pattern set generator 121 ends.

Moving on to FIG. 4, shown is a flowchart that provides one example of the operation of a portion of the pattern set generator 121 according to various embodiments. It is understood that the flowchart of FIG. 4 provides merely an example of the many different types of functional arrangements that may be employed to implement the operation of the portion of the pattern set generator 121 as described herein. As an alternative, the flowchart of FIG. 4 may be viewed as depicting an example of steps of a method implemented in the computing environment 103 (FIG. 1) according to one or more embodiments.

The flowchart of FIG. 4 provides an example of the functionality that may be performed when creating the automated testing pattern set 136 for an associated application category 124.

Beginning with box 403, the pattern set generator 121 determines whether the results for each corresponding random testing pattern 130 from the random pattern automated testing were equivalent results to those from the manual testing. For example, if the manual testing of the same random testing pattern 130 yielded a negative result (e.g. an error), yet the result from the random pattern automated testing yielded a positive result (e.g. no error), the pattern set generator 121 would determine that the results associated with the specific random testing pattern 130 generated during the random pattern automated testing are not consistent with the more reliable results produced from the manual testing. If the pattern set generator 121 determines that the results did not match, the pattern set generator 121 proceeds to box 406. However, if the pattern set generator 121 determines that the results did match, the pattern set generator 121 proceeds to box 409.

In box 406, the pattern set generator 121 decrements an accuracy score 139 associated with the particular random testing pattern 130. While FIG. 4 generates an accuracy score by decrementing or incrementing the score based on whether the results matched, this is one of many different approaches that may be used to generate the accuracy score 139. The accuracy score 139 associated with the particular random testing pattern 130 may reflect a type of confidence rating associated with the particular random testing pattern 130. As such, the higher the accuracy score 139, the more likely the same random testing pattern 130 would yield accurate and reliable results when used to test another application in the same application category 124. Therefore, since it was determined that the results from the random pattern automated testing specific to the random testing pattern 130 were inconsistent with the results from the more reliable manual testing, the accuracy score 139 is decremented. Upon decrementing the accuracy score 139 of the failed random testing pattern 130, the pattern set generator 121 proceeds to box 412.

In box 409, the pattern set generator 121 increments the accuracy score of the passing random testing pattern 130. As previously discussed, the accuracy score 139 associated with the particular random testing pattern 130 may reflect a type of confidence rating associated with the particular random testing pattern 130. As such, the higher the accuracy score 139, the more likely the same random testing pattern 130 would yield accurate and reliable results when used to test another application in the same application category 124. Since the pattern set generator 121 determined that the random testing pattern 130 yielded accurate and reliable results following verification by manual testing, the accuracy score 139 associated with the passing random testing pattern 130 will be incremented to reflect a more confident rating. Upon incrementing the accuracy score 139 of the passing pattern, the pattern set generator 121 proceeds to box 412.

In box 412, the pattern set generator 121, updates the automated testing pattern set 136 associated with the identified application category 124. Since the automated testing pattern set 136 comprises random testing patterns 130 that confidently yield accurate and reliable results in testing other applications that may fall in the same application category 124, the pattern set generators 121 selects random testing patterns 130 based off of the accuracy score 139. The accuracy score 139 may reflect a type of confidence rating that is either increased or decreased each time the respective random testing pattern 130 is used during automated testing and verified through manual testing. Additionally, an accuracy score 139 will be higher for random testing patterns 130 that have been tested and positively verified for applications in the same application category 124.

In one non-limiting example, the pattern set generator 121 may rank the random testing patterns 130 associated with a particular application category 124 based on the accuracy score 139. After ranking the random testing patterns 130, the pattern set generator 121 may select a predefined number of the highest ranked random testing patterns 130.

In another non-limiting example, the pattern set generator 121 may select all random testing patterns 130 that are greater than a predefined score. For example, if the predefined score is five-hundred than all random testing patterns 130 that are greater than five-hundred will be used to populate the automated testing pattern set 136 associated with the application category 124. Upon updating the automated testing pattern set 136 associated with the application category 124, the automated testing application 115 ends.

Figure 5:
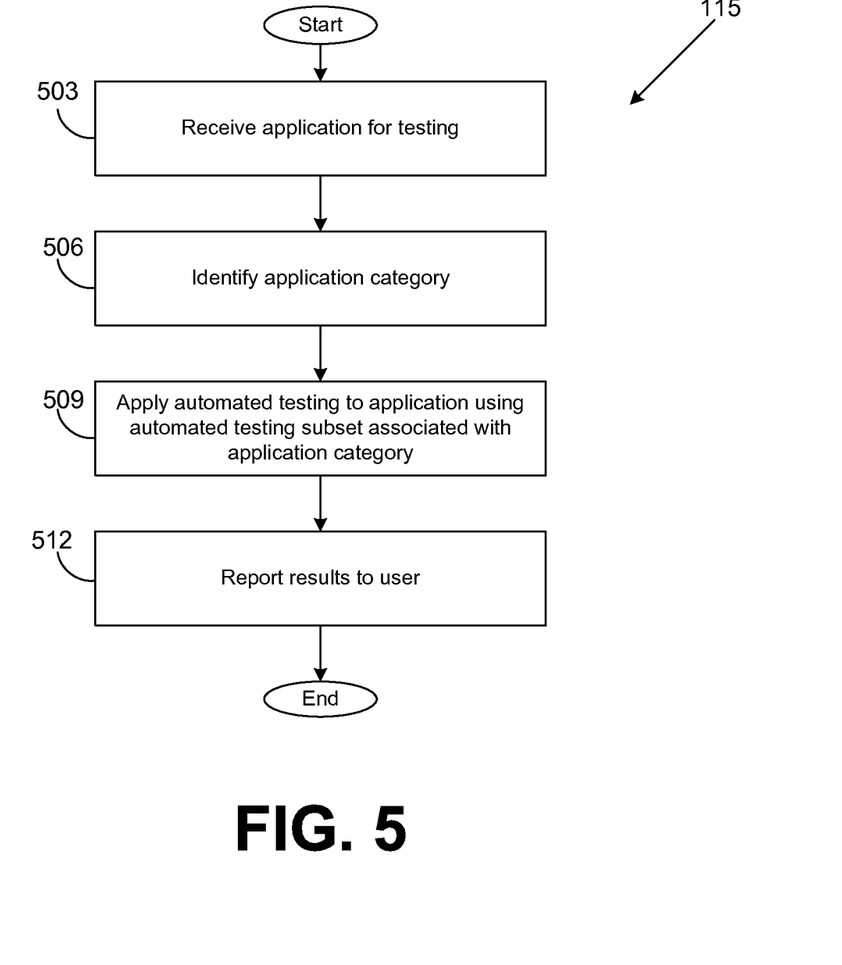

Turning now to FIG. 5, shown is a flowchart that provides one example of the operation of a portion of the automated testing application 115 according to various embodiments. It is understood that the flowchart of FIG. 5 provides merely an example of the many different types of functional arrangements that may be employed to implement the operation of the portion of the automated testing application 115 as described herein. As an alternative, the flowchart of FIG. 5 may be viewed as depicting an example of steps of a method implemented in the computing environment 103 (FIG. 1) according to one or more embodiments.

FIG. 5 provides an example of the functionality that may be performed when using automated testing based on an automated testing pattern set 136 to test an application.

Beginning with box 503, the automated testing application 115 receives an application for testing. The application submitted for testing may be submitted through a network page generated by the automated testing application 115 that may be rendered on a user interface 154 of a client device 106. Upon receiving an application for testing, the automated testing application 115 proceeds to box 506.

In box 506, the automated testing application 115 identifies the application category 124 associated with the application. The application category 124 may be identified from multiple application categories 124 which may include, for example, tools, books/references, communication, media/video, shopping, economy/finance, brain/puzzles, sports, travel, health/fitness, personalization, arcade/action, education, entertainment, comics, casual games, business, learning, productivity, news/magazines, or any other type of application. In another non-limiting example, the application categories 124 may further comprise different platforms, such as, for example, Android®, iOS®, Windows® Phone, or other type of application platform. The automated testing application 115 may evaluate multiple factors associated with the application to determine the appropriate application category 124. For example, the automated testing application 115 may determine the appropriate application category 124 based on factors, such as, for example an application's metadata, application's developer, type of compatible mobile platform, or other factor associated with an application. Upon identification of the application category 124, the automated testing application 115 proceeds to box 509.

In box 509, the automated testing application 115 applies automated testing to the application using an automated testing pattern set 136 that is associated with the identified application category. The automated testing pattern set 136 may be created with a high confidence of producing accurate and reliable testing results for any application in the corresponding application category 124. For each pattern in the automated testing pattern set 136 applied to the application, the automated testing application 115 may determine whether the application passed or failed based on the particular pattern. Upon completion of the automated testing of the application, the automated testing application 115 proceeds to box 512.

In box 512, the automated testing application 115 reports the results from the automated testing using the automated testing pattern set 136 to the user. In one non-limiting example, an application may be considered to have passed the automated testing based on a predetermined percentage of patterns from the automated testing pattern set 136 applied to the application which did not produce any errors. For example, if 98% of the patterns applied to the application did not produce any errors, the automated testing application 115 may determine that the application passed the testing. In another non-limiting example, an application may be considered to have passed the automated testing if no errors occurred during the testing of the application.

The automated testing application 115 may encode a result notification with the results produced from the automated testing of the application. The result notification may be in the form an electronic message, such as, for example, an email message, an instant message, a text message, a message embedded within a network page, or other type of notification. The result notification may include a statement that the application passed the testing. However, the result notification may include a statement that the application failed the automated testing. If the application failed the automated testing, automated testing application 115 may encode the network page with additional information associated with the failure of the application. After encoding the result notification with the testing results, the automated testing application 115 sends the result notification to client device associated with a user (e.g. developer). Upon sending the result notification to the user, the automated testing application 115 ends.

Figure 6A:
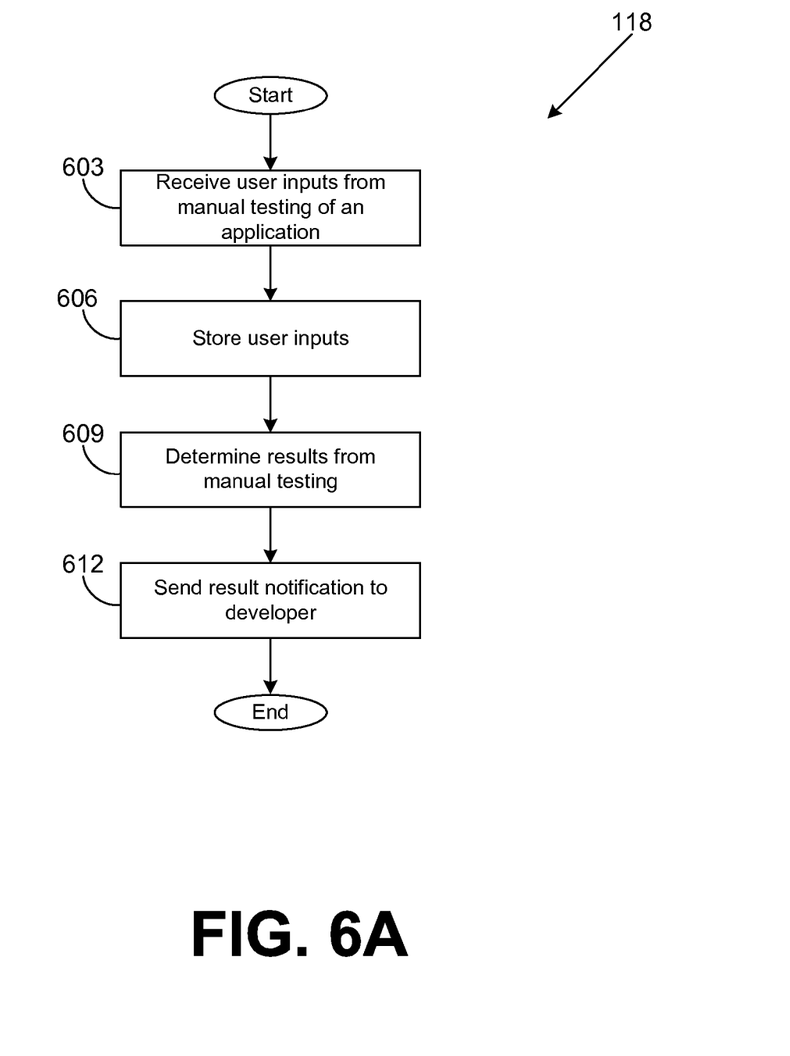

Moving on to FIG. 6A, shown is a flowchart that provides one example of the operation of a portion of the event recording service 118 according to various embodiments. It is understood that the flowchart of FIG. 6A provides merely an example of the many different types of functional arrangements that may be employed to implement the operation of the portion of the event recording service 118 as described herein. As an alternative, the flowchart of FIG. 6A may be viewed as depicting an example of steps of a method implemented in the computing environment 103 (FIG. 1) according to one or more embodiments.

FIG. 6A provides an example of the functionality that may be performed in order to record a series of inputs during the testing of an original application for the purpose of using the same series of inputs for an altered version of an application where the alterations reflect changes made following a failing result from the testing of the original application.

Beginning with box 603, the event recording service 118 receives user inputs from the manual testing of an application. For example, the event recording service 118 may monitor the user inputs that a manual tester uses to test a particular application. Upon receiving the user inputs from the manual testing of the application, the event recording service 118 proceeds to box 606.

In box 606, the event recording service 118 stores the user inputs received through the monitoring of the manual testing. Essentially, the event recording service 118 records the received series of user inputs and stores the series of user inputs associated with the particular application. Upon storing the received series of user inputs the event recording service 118 proceeds to box 609.

In box 609, the event recording service 118 determines the results from the manual testing of an application. In one non-limiting example, the manual tester may input the results on whether the application passed or failed the manual testing. Additionally, the manual tester may input reasons for failure if such a failure occurred. In another non-limiting example, the event recording service 118 may be able to determine based on the monitoring of the manual testing whether any errors occurred during the testing. Upon determining the results of the manual testing, the event recording service 118 proceeds to box 612.

In box 612, the event recording service 118 sends a results notification to a client device associated with a user (e.g. developer). The results notification may report the errors received during the testing, instructions on how to submit an altered application for retesting, or other information concerning the testing of the application. As such, the automated testing application 115 may encode a result notification with the results produced from the automated testing of the application. The result notification may be in the form an electronic message, such as, for example, an email message, an instant message, a text message, a message embedded within a network page, or other type of notification. After encoding the result notification with the testing results, the automated testing application 115 sends the result notification to client device associated with a user (e.g. developer). Upon sending the result notification to the user, the event recording service 118 ends.

Figure 6B:
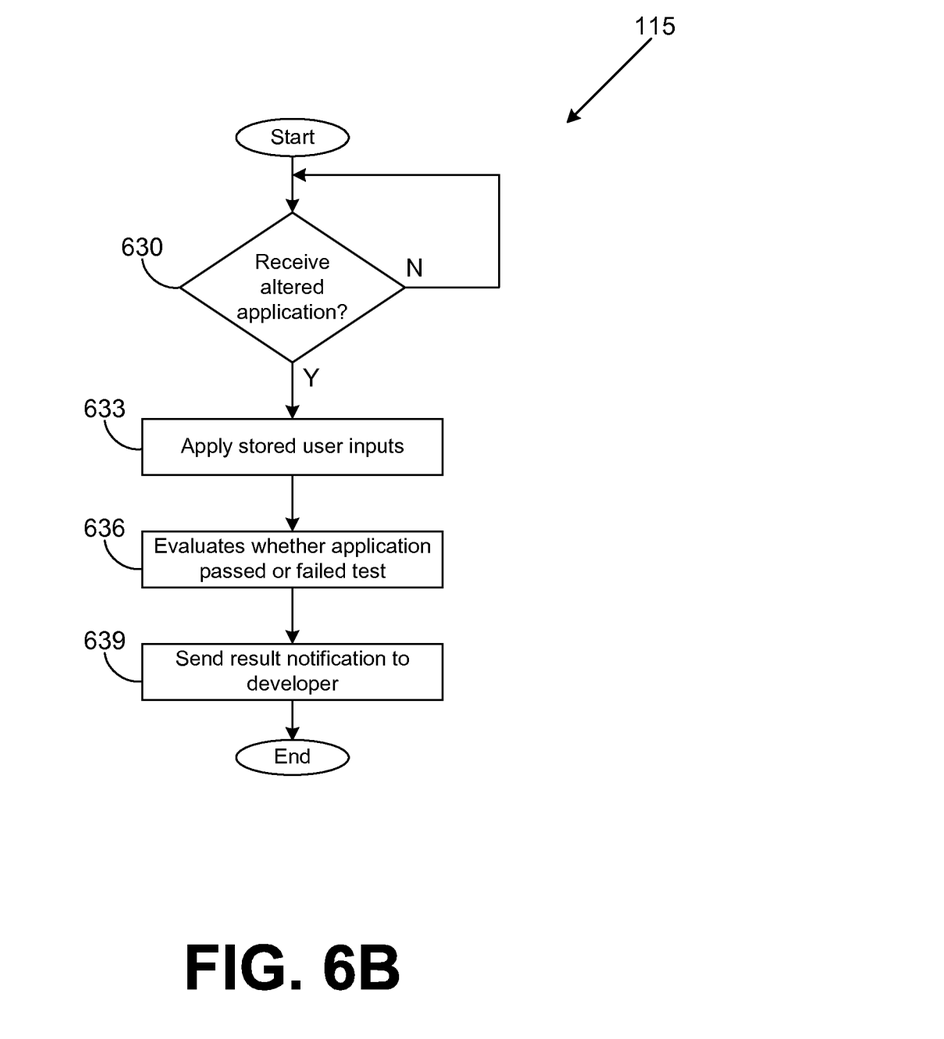

Referring next to FIG. 6B, shown is a flowchart that provides one example of the operation of a portion of the automated testing application 115 according to various embodiments. It is understood that the flowchart of FIG. 6B provides merely an example of the many different types of functional arrangements that may be employed to implement the operation of the portion of the automated testing application 115 as described herein. As an alternative, the flowchart of FIG. 6B may be viewed as depicting an example of steps of a method implemented in the computing environment 103 (FIG. 1) according to one or more embodiments.

FIG. 6B provides an example of the functionality that may be performed to test an altered application using the same testing patterns as used during the testing of a failed original application.

Beginning with box 630, the automated testing application 115, waits to receive an altered application. An altered application may be an application that has been updated from an original application which may have already undergone at least one round of testing, and subsequently failed. Upon receipt of an altered application, automated testing application 115 proceeds to box 633.

In box 633, the automated testing application 115, uses automated testing to test the application by applying the stored user inputs associated with the original application as discussed in further detail with reference to FIG. 6A. The altered application likely has been amended based on the failures of the original or earlier altered applications previously reported to the developer or other user based on the same series of user inputs. Therefore, same series of inputs that cause previous failures are applied again to the altered application to determine whether or not the altered application continues to receive similar or new errors based on the same set of inputs. Upon testing the altered application, the automated testing application 115, proceeds to box 636.

In box 636, the automated testing application 115 evaluates whether the automated testing of the altered application produced passing or failing results. In one non-limiting example, an application may be considered to have passed the automated testing using the series of user inputs used to test the original or previously altered applications if the testing did not produce any errors. In another non-limiting example, an application may be considered to have passed if the automated testing using the series of user inputs produced a predefined minimum number of errors. After evaluating whether an application passed or failed the automated testing using a series of previously entered user inputs, the automated testing application 115 proceeds to box 639.

In box 639, the automated testing application 115 sends a result notification to a client device associated with a user (e.g. developer). To begin, the automated testing application 115 may encode a result notification with the results produced from the automated testing of the application. The result notification may be in the form an electronic message, such as, for example, an email message, an instant message, a text message, a message embedded within a network page, or other type of notification. The result notification may include a statement that the application passed the testing. However, the result notification may include a statement that the application failed the automated testing. If the application failed the automated testing, automated testing application 115 may encode the network page with additional information associated with the failure of the application. The result notification may also include other information associated with the testing of the application. After encoding the result notification with the testing results, the automated testing application 115 sends the result notification to client device associated with a user (e.g. developer). Upon sending the result notification to the user, the automated testing application 115 ends.

Figure 7:
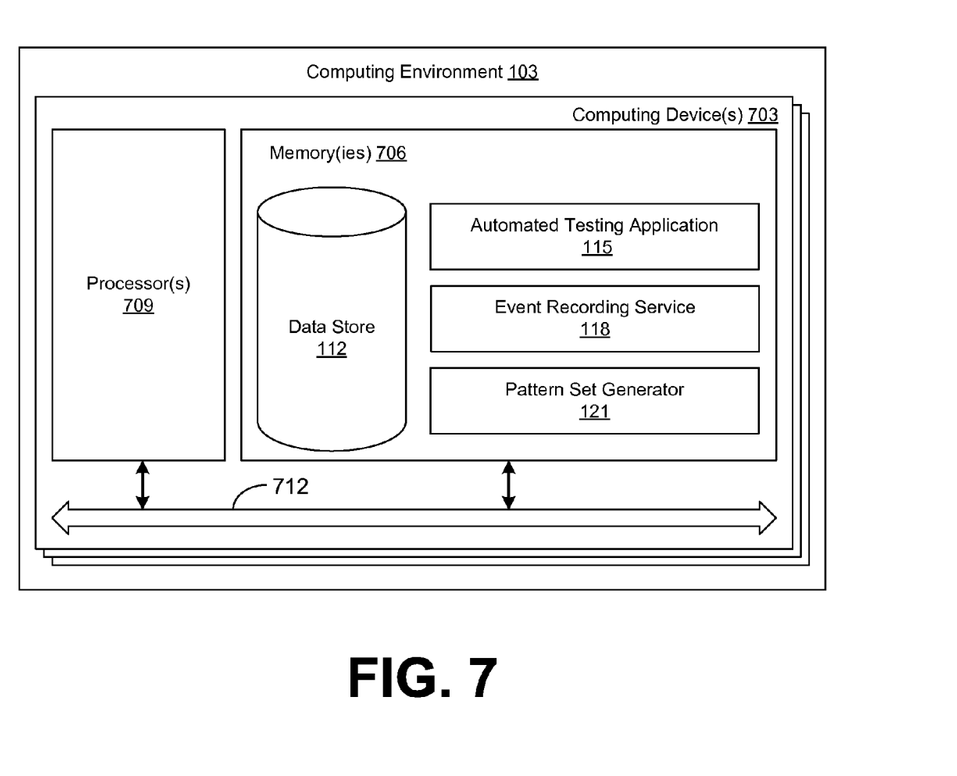
FIG. 7 is a schematic block diagram that provides one example illustration of a computing environment employed in the networked drawing of FIG. 1 according to various embodiments of the present disclosure.

With reference to FIG. 7, shown is a schematic block diagram of the computing environment 103 according to an embodiment of the present disclosure. The computing environment 103 includes one or more computing devices 703. Each computing device 703 includes at least one processor circuit, for example, having a processor 709 and a memory 706, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 706 are both data and several components that are executable by the processor 709. In particular, stored in the memory 706 and executable by the processor 709 are the automated testing application 115, the event recording service 118, and the pattern set generator 121, and potentially other applications. Also stored in the memory 706 may be a data store 112 and other data. In addition, an operating system may be stored in the memory 706 and executable by the processor 709.

It is understood that there may be other applications that are stored in the memory 706 and are executable by the processor 709 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 709. In this respect, the term "executable" means a program file that is in a form that can ultimately be run by the processor 709. Examples of executable programs may be, for example, a compiled program that can be translated into machine code in a format that can be loaded into a random access portion of the memory 706 and run by the processor 709, source code that may be expressed in proper format such as object code that is capable of being loaded into a random access portion of the memory 706 and executed by the processor 709, or source code that may be interpreted by another executable program to generate instructions in a random access portion of the memory 706 to be executed by the processor 709, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 709 may represent multiple processors 709 and the memory 706 may represent multiple memories 706 that operate in parallel processing circuits, respectively. In such a case, the local interface 712 may be an appropriate network 109 (FIG. 1) that facilitates communication between any two of the multiple processors 709, between any processor 709 and any of the memories 706, or between any two of the memories 706, etc. The local interface 712 may comprise additional systems designed to coordinate this communication, including, for example, performing load balancing. The processor 709 may be of electrical or of some other available construction.

Although the automated testing application 115, event recording service 118, pattern set generator 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-6B show the functionality and operation of an implementation of portions of the pattern set generator 121, automated testing application 115 and event recording service 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 709 in a computer system or other system. The machine code may be converted from the source code, etc. If embodied in hardware, each block may represent a circuit or a number of interconnected circuits to implement the specified logical function(s).

Although the flowcharts of FIGS. 3-6B show a specific order of execution, it is understood that the order of execution may differ from that which is depicted. For example, the order of execution of two or more blocks may be scrambled relative to the order shown. Also, two or more blocks shown in succession in FIGS. 3-6B may be executed concurrently or with partial concurrence. Further, in some embodiments, one or more of the blocks shown in FIGS. 3-6B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the automated testing application 115, the event recording service 118, and the pattern set generator 121, that comprises software or code can be embodied in any non-transitory computer-readable medium for use by or in connection with an instruction execution system such as, for example, a processor 709 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
   receive an application for testing;
   select a specific application category of a plurality of application categories based at least in part on the application;
   determine that an automated testing pattern subset associated with the specific application category is incomplete based at least in part on at least one of a number of other applications tested using the automated testing pattern subset or a number of testing patterns included in the automated testing pattern subset; and
   in response to determining that the automated testing pattern subset associated with the specific application category is incomplete:
      perform automated random testing on the application, the automated random testing generating a plurality of random testing patterns;
      determine a plurality of random testing results based at least in part on the automated random testing of the application, individual ones of the plurality of random testing results corresponding to a respective random testing pattern of the plurality of random testing patterns;
      store the plurality of random testing results and the plurality of random testing patterns;
      receive a plurality of manual testing results determined from manual testing of the application;
      calculate an accuracy score for individual ones of the plurality of random testing patterns based at least in part on a comparison of the plurality of manual testing results with the plurality of random testing results; and
      determine whether to add at least one of the plurality of random testing patterns to the automated testing pattern subset associated with the specific application category based at least in part on the accuracy score associated with the individual ones of the plurality of random testing patterns.

2. The non-transitory computer-readable medium of claim 1, wherein, when executed, the program further causes the at least one computing device to at least perform additional automated testing on the application based at least in part on the automated testing pattern subset associated with the specific application category in response to determining that the automated testing pattern subset is complete.

3. The non-transitory computer-readable medium of claim 2, wherein, when executed, the program further causes the at least one computing device to at least send a notification to a user, wherein the notification includes at least one automated testing result.

4. A system, comprising:
   at least one computing device; and
   at least one application executable in the at least one computing device, wherein, when executed, the at least one application causes the at least one computing device to at least:
      select a specific application category of a plurality of application categories based at least in part on an application received for testing;
      determine that an automated testing pattern subset associated with the specific application category is incomplete based at least in part on at least one of a number of other applications tested using the automated testing pattern subset or a number of testing patterns included in the automated testing pattern subset; and
      in response to determining that the automated testing pattern subset associated with the specific application category is incomplete:
         perform automated random testing on the application, the automated random testing generating a plurality of random testing patterns;
         determine a plurality of random testing results based at least in part on the automated random testing of the application, individual ones of the plurality of random testing results corresponding to a respective random testing pattern of the plurality of random testing patterns;
         receive a plurality of manual testing results determined from manual testing of the application;
         calculate an accuracy score for individual ones of the plurality of random testing patterns based at least in part on a comparison of the plurality of manual testing results with the plurality of random testing results; and
         determine whether to add at least one of the plurality of random testing patterns to the automated testing pattern subset associated with the specific application category based at least in part on the accuracy score associated with the individual ones of the plurality of random testing patterns.

5. The system of claim 4, wherein, when executed, the at least one application causes the at least one computing device to at least rank the individual ones of the plurality of random testing patterns according to the accuracy score, a highest ranked random testing pattern of the plurality of random testing patterns being determined to be added to the automated testing pattern subset.

6. The system of claim 4, wherein the application is a first application, and when executed, the at least one application causes the at least one computing device to at least:
   receive a second application for testing from a developer client device, the second application being associated with the specific application category; and
   perform automated testing of the second application by applying the automated testing pattern subset associated with the specific application category to the second application.

7. The system of claim 6, wherein, when executed, the at least one application causes the at least one computing device to at least determine that the second application passed the automated testing.

8. The system of claim 6, wherein, when executed, the at least one application causes the at least one computing device to at least determine that the second application failed the automated testing.

9. The system of claim 6, wherein, when executed, the at least one application causes the at least one computing device to at least send a notification including at least one automated testing result to a client device.

10. The system of claim 4, wherein the automated testing pattern subset is selected from a plurality of automated testing pattern subsets, and individual ones of the automated testing pattern subsets are associated with a corresponding application category of the plurality of application categories.

11. The system of claim 4, wherein a respective random testing pattern of the plurality of random testing patterns is determined to be accurate when a respective random testing result of the plurality of random testing results is the same as at least one of the plurality of manual testing results.

12. The system of claim 11, wherein the accuracy score is incremented when the respective random testing pattern is determined to be accurate.

13. The system of claim 11, wherein the accuracy score is decremented when the respective random testing pattern is determined to be accurate.

14. A method, comprising:
    selecting, via at least one computing device, a specific application category of a plurality of application categories based at least in part on an application received for testing;
    determining, via the at least one computing device, that an automated testing pattern subset associated with the specific application category is incomplete based at least in part on at least one of a number of other applications tested using the automated testing pattern subset or a number of testing patterns included in the automated testing pattern subset; and
    in response to determining that the automated testing pattern subset associated with the specific application category is incomplete:
        performing, via the at least one computing device, automated random testing on the application, the automated random testing generating a plurality of random testing patterns;
        determining, via at least one computing device, a plurality of random testing results based at least in part on the automated random testing of the application, individual ones of the plurality of random testing results corresponding to a respective random testing pattern of the plurality of random testing patterns;
        receiving, via at least one computing device, a plurality of manual testing results determined from manual testing of the application;
        calculating, via at least one computing device, an accuracy score for individual ones of the plurality of random testing patterns based at least in part on a comparison of the plurality of manual testing results with the plurality of random testing results; and
        determining, via the at least one computing device, whether to add at least one of the plurality of random testing patterns to the automated testing pattern subset associated with the specific application category based at least in part on the accuracy score associated with the individual ones of the plurality of random testing patterns.

15. The method of claim 14, wherein the application is a first application, and the method further comprises:
    receiving, via the at least one computing device, a second application for testing from a developer client device, the second application being associated with the specific application category; and
    performing, via the at least one computing device, automated testing on the second application using the automated testing pattern subset associated with the specific application category.

16. The method of claim 15, further comprising determining, via the at least one computing device, that the automated testing of the second application creates a failure.

17. The method of claim 16, further comprising notifying, via the at least computing device, the developer client device of the failure.

18. The method of claim 17, further comprising:
    receiving, via the at least one computing device, an altered version of the second application from the developer client device, wherein the second application is altered in response to the failure; and
    performing, via the at least one computing device, the automated testing of the altered version using the automated testing pattern subset associated with the specific application category.

19. The method of claim 14, wherein the automated testing pattern subset is selected from a plurality of automated testing pattern subsets, and individual ones of the automated testing pattern subsets are associated with a corresponding application category of the plurality of application categories.

20. The method of claim 14, further comprising:
    ranking, via the at least one computing device, the individual ones of the plurality of random testing patterns according to the accuracy score; and
    wherein the at least one of the plurality of random testing patterns are determined to be added to the automated testing pattern subset based at least in part on the ranking.

* * * * *